INDIUM DOPED PICKUP TUBE TARGET

Filed Feb. 21, 1961

INVENTOR.
ROBERT L. VAN ASSELT
BY L. A. Larsen
ATTORNEY

United States Patent Office 3,350,591

Patented Oct. 31, 1967

3,350,591
INDIUM DOPED PICKUP TUBE TARGET

Robert L. Van Asselt, Lancaster, Pa., assignor to Radio Corporation of America, a corporation of Delaware Filed Feb. 21, 1961, Ser. No. 90,748
8 Claims. (Cl. 313—65)

This invention relates to an improved photoemissive type device. In particular, this invention relates to an improved target electrode assembly for use in the photoemissive type pickup or camera tube.

There are certain photoemissive type camera tubes that are known as image orthicons. The image orthicon tube comprises an evacuated envelope having a photoemissive cathode in one end thereof. The photoemissive cathode is exposed to light from a scene to be reproduced and emits photoelectrons in proportion to this light. The resulting photoelectron image is directed onto a side of a semi-conducting storage target adjacent to said photoemissive cathode to produce a stored image. The opposite side of the storage target is scanned by an electron beam which reads out signals corresponding to the image stored on the target, and that were produced by the original photoelectron image. As the beam reads out the stored signal, it produces output signals from the tube.

In the image orthicon type camera tube, the semi-conducting storage target must have certain characteristics in order for the tube to efficiently operate with presently used scanning rates and light levels. One of these characteristics is that, for conventional television scanning rates and signal levels, the resistivity of the target should be approximately $10^{11}$ ohm-centimeters. For other television scanning rates, for example PPI scanning rates, other target resistivities are preferably used.

Another desirable characteristic of the target in an image orthicon type tube is that the target must be thermally stable and chemically inactive when exposed to materials that are conventionally used for the photoemissive cathode. As an example, there are certain chemicals which are used in the known and highly sensitive multi-alkli photoemitter described in U.S. Patent No. 2,770,561 to Sommer, which chemically react with some of the known image orthicon target materials. Because of this chemical reatcion, this highly efficient photoemitter canont be efficiently used with the conventional image orthicon target materials.

Another highly desirable characteristic of a target for an image orthicon type camera tube is that the target should be capable of operation for a relatively long period of time without changing any of its electrical characteristics. Some of the known target materials conduct a charge through the target, by means of a conduction which is ionic in nature. These materials have been found to change with use resulting in the occurrence of an undesirable after image. Then the type must be replaced.

It is therefore an object of this invention to provide an improved target electrode structure for use in an image orthicon type pickup tube.

It is a further object of this invention to provide a novel method of and means for adjusting the resistivity in an improved image orthicon target structure.

It is a still further object of this invention to provide an improved photoemissive type camera tube.

These and other objects are accomplished in accordance with this invention by providing a novel image orthicon in which an improved long-life target electrode structure is made of a thin film which includes aluminum oxide or magnesium oxide or both and in which the resistivity of the thin film is adjusted to its desired value by the provision of a material selected from the group including indium and indium oxide within the target structure.

The invention will be more clearly understood by reference to the accompanying single sheet of drawings wherein.

Figure 1:
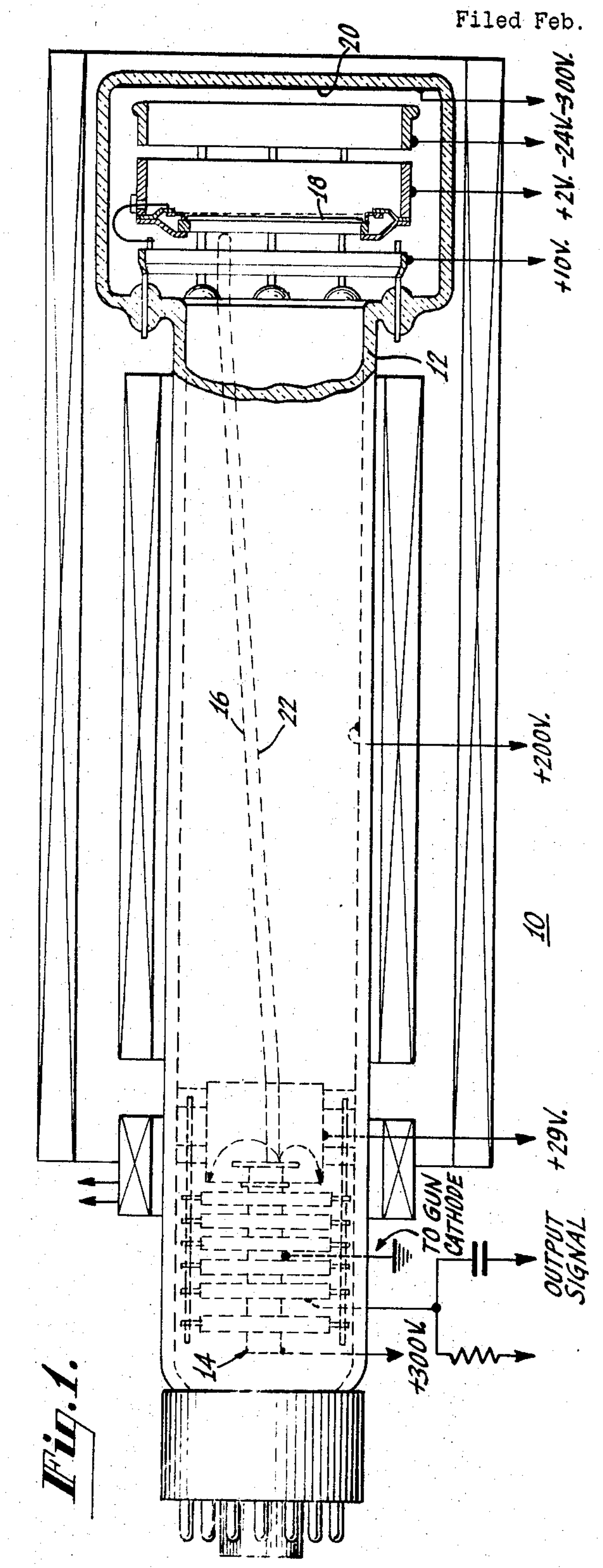
FIG. 1 is a perspective view partially broken away of an improved image orthicon tube made in accordance with this invention.

Referring now to FIG. 1, the image orthicon tube 10 comprises an evacuated envelope 12 having an electron gun 14 in one end thereof. The electron gun, which may be of any conventional gun design, produces an electron beam 16 that is directed, by means of conventional electrostatic and magnetic fields, toward the other end of the envelope 12. Within the other end of the envelope 12 there is provided a dielectric storage target 18 which will subsequently be described in detail.

On the inner surface of the said other end of the envelope 12 is a photoemissive cathode, or layer, 20 which may be any of the known photoemissive materials such as the commercially available S–11 surface described in the U.S. Patent No. 2,676,282 to Polkosky, or the commercially available multi-alkali photoemissive surface described in U.S. Patent No. 2,770,564 to Sommer.

The photoelectrons emitted from the photocathode 20 are in proportion to the amount and shade of light from a scene to be reproduced and are accelerated, and land on, the side of the target 18 facing the photocathode 20. As this photoelectron image lands on the target 18, it establishes a charge image on the opposite side of the target 18, i.e., the side of the target 18 facing the electron gun 14, which correspond to the original light image. The electron beam 16 scans, by means of conventional focusing coils, deflection yokes and alignment coils as shown, the charge image on the target 18. As the beam 16 scans the target 18, the beam erases the charge image and the balance of the primary electron beam is reflected back toward the electron gun 14 as a return electron beam 22. The return electron beam is passed through a conventional electron multiplier to produce an output signal from the tube.

Figure 2:
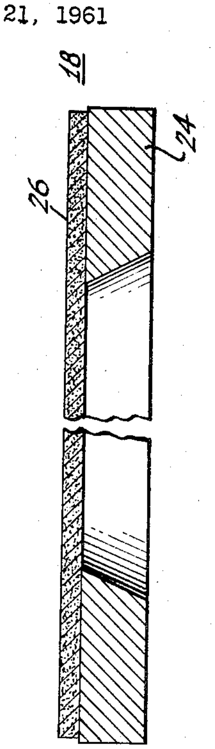
FIG. 2 is a greatly enlarged sectional view of the novel target structure shown in FIG. 2 and in accordance with this invention; and, FIG. 3 is a side view of an evaporator unit for use during the manufacture of a target of the type shown in FIGS. 1 and 2.

The tube 10, and its operation that have been described are conventional except for the inclusion within the tube of a novel semi-conducting storage target 18. Referring to FIG. 2, there is shown an enlarged, partially broken away, sectional view of the novel storage target 18. The target 18 comprises a support ring 24 having a thin membrane of semi-conducting material 26 stretched across the opening in the support ring 24.

In accordance with this invention, the membrane 26 comprises magnesium, aluminum, oxygen and a selected amount of indium, or indium oxide, so that the resistivity of the target membrane is that necessary for operation under the selected conditions of scanning rate, signal level, etc.

As an example, an evaporated layer consisting principally of magnesium oxide is substantially chemically inert with respect to the conventional photoemissive materials. However, magnesium oxide is very insulating having a resistivity, at the very minimum, of the order of $10^{14}$ ohm-centimeters, or greater. This high resistivity limits the usefulness of pure magnesium oxide as an image orthicon target. For example, where long storage times and very low light levels are employed, a pure magnesium oxide target is very useful. However, with conventional television scanning rates, and light levels, this high resistivity results in picture "sticking."

The preferred target 18, i.e., one having a resistivity of approximately $10^{11}$ ohm-centimeters, may be made as follows:

A substrate (not shown), e.g., nitro-cellulose, is formed on the support ring 24 by any conventional means, such as flotation filming. The support ring 24 is selected for its strength and for its substantially matching coefficient of expansion, and one material which has been found useful is molybdenum. The nitro-cellulose substrate, while on the ring, is placed in a vacuum chamber and on a support member (not shown), and the materials required for depositing the target are placed in one or more evaporator boats 28. The evaporator boat, or boats, are positioned a distance of about 20 cm. from the substrate. During the evaporation process, a vacuum of better than $10^{-5}$ mm. of Hg is preferred.

Figure 3:
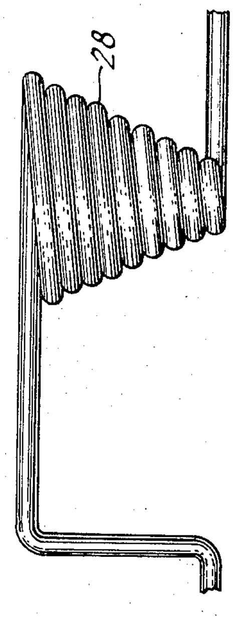

Aluminum is first evaporated until the light transmission through the substrate and the deposited aluminum layer is approximately 80% of that of the original light transmission through the substrate. The monitoring light source may be any conventional visible source, while the monitoring detector may be a phototube such as the 931A. Then, a magnesium alloy including indium is evaporated, until the light transmission is reduced to 0.15% of that of the original transmission through the uncoated substrate. The ratio of indium to magnesium in the alloy used, is selected so that the final target film will have the desired resistivity of approximately $10^{11}$ ohm-centimeters. An alloy of 10% magnesium, 25% aluminum and 65% indium, by weight, has been used successfully. The amount of material that is placed in the evaporator boat 28, one example of which is shown in FIG. 3, is several times the amount of material that is required to produce a target film. For example, 400 milligrams of the alloy have been successfully used, to make a film which is approximately 700 Angstrom units thick and 1.75 inches in diameter. The evaporator boat 28 is heated to a temperature of approximately 450° C. to 500° C. to provide the desired evaporation. By following the above listed steps, a layer of indium "doped" aluminum oxide-magnesium oxide which is believed to be approximately 740 Angstrom units thick is deposited. By evaporating at slightly different rates, for example having the evaporation boats operating at different temperatures, compositions other than the 10% magnesium, 25% aluminum and 65% indium can be used and produce substantially the same result.

By "doped" is meant that the indium enters the pores or grain boundaries of the magnesium oxide-aluminum oxide layer. This term is also meant to include the situation wherein the indium becomes a part of the crystal lattice of the base layer.

Other methods of applying the indium "doped" magnesium film during the oxidizing process described in the of indium and magnesium, each element being evaporated from a separately controlled evaporator boat can also produce films of suitable compositions. Still further, evaporation of a thin film of indium either before, or after, the magnesium is deposited will probably produce the desired result, since the indium melts at a low temperature and should diffuse throughout the thin magnesium film during the oxidizing process described in the following paragraph.

After the materials have been deposited, the target 18 is placed in an oven through which very dry, e.g., a dew point of approximately −70° C. oxygen, is continuously flowing. An initial bake of approximately 20 minutes at approximately 200° C. will remove the nitro-cellulose substrate. Then, the temperature of the target is increased, in steps of approximately 10° C. per minute, up to a temperature range of about 500° C. to 550° C. Oxidation of the indium doped magnesium film begins to be noticeable at about 400° C. and the film is completely oxidized near 500° C. The film is held in the 500–550° C. range for 10 to 15 minutes and then allowed to cool slowly. About 1 hour is used for the heating cycle and about 2 hours for the cooling cycle. Extended oxidations, up to 18 hours, at a temperature of about 400° C. have also successfully been used. The aluminum oxide-magnesium oxide-indium "doped" film is firmly attached to the support ring 24 by this process and is ready for assembly to the conventional collector grid support ring and for insertion into the envelope 12.

At this stage of the manufacturing process, it is believed that the indium "doping" material in the target has primarily been converted into indium oxide. Since both of these materials are more conducting than the magnesium oxide or aluminum oxide, either the indium or the indium oxide will provide the desired target resistivity. Also, during the subsequent, conventional photocathode manufacturing step, when the photocathode includes cesium, which is usually the case, the cesium metal will tend to reconvert any exposed indium oxide into indium. Thus, the exact composition of the target, i.e. whether it includes indium or indium oxide, is not known, but either of these materials provide the desired result of decreasing the target resistivity.

It should be noted that the molybdenum ring 24 has an aperture therein which has beveled sides. The bevel, as shown, forms an angle of approximately 15° with the vertical. If the angle of the bevel is too sharp, it has been found that the support ring will tend to cut through the thin semi-conducting target 26. If the peripheral edge of the aperture is too round, the nitro-cellulose substrate will tend to adhere to the surface and the unsupported film will be stretched below the plane of the ring surface. This has two disadvantages, difficulties in accurate target-mesh spacing and tendency for less tension in the oxide film. Thus, the preferred maximum radius at the periphery of the aperture of the support ring 24 is approximately 0.002 inch. The surface of the support ring 24 that is in contact with the semi-conducting film 26 is lapped and polished so that good contact will be made with the semi-conducting film 26.

What is claimed is:

1. A pickup tube comprising an evacuated envelope having an electron gun in one end thereof for producing an electron beam directed along a path, a photoemissive cathode in the other end of said envelope for producing a photoelectron image directed along a path, a target electrode positioned in the path of said electron beam and in the path of said photoelectron image, said target electrode comprising a first material selected from the group consisting of magnesium oxide and aluminum oxide, and a second material selected from the group consisting of indium and indium oxide, said target having a resistivity of substantially $10^{11}$ ohm-centimeters.

2. A photoemissive pickup tube comprising an evacuated envelope, an electron gun for producing an electron beam in one end of said envelope, a semi-conductive target electrode in said envelope and in the path of said electron beam, a photoemissive cathode in the other end of said envelope for producing a photoelectron image, means for directing said photoelectron image onto said semi-conductive target electrode, said target electrode comprising magnesium oxide and indium and having a resistivity value of not more than $10^{11}$ ohm-centimeters, said semi-conducting target being from about 500 to several thousand Angstrom units thick.

3. A television pickup tube comprising an envelope, said envelope having therein an electron gun a photocathode, and a target electrode between said photocathode and said electron gun, said target electrode comprising magnesium oxide, aluminum oxide, and indium oxide, said target electrode having a resistivity of $10^{11}$ ohm-centimeters.

4. A television pickup tube comprising an evacuated envelope having an electron gun in one end thereof for producing an electron beam directed along a path, a photoemissive cathode in the other end of said envelope for producing a photoelectron image directed along a path, and a target electrode positioned in the path of said beam and in the path of said photoelectron image, said target electrode comprising magnesium oxide and a material selected from the group consisting of indium and indium oxide, said target electrode having a resistivity of about $10^{11}$ ohm-centimeters.

5. A television pickup tube comprising an envelope having an electron gun in one end thereof for producing an electron beam directed along a path, a photoemissive cathode in the other end of said envelope for producing a photoelectron image directed along a path, and a target electrode positioned in the path of said electron beam and in the path of said photoelectron image, said target electrode comprising magnesium oxide having a resistivity greater than $10^{11}$ ohm-centimeters, and indium having a resistivity less than $10^{11}$ ohm-centimeters, said target having a resistivity no greater than $10^{11}$ ohm-centimeters.

6. A television pickup tube comprising an evacuated envelope having an electron gun in one end thereof for producing an electron beam directed along a path, a photoemissive cathode in the other end of said envelope for producing a photoelectron image directed along a path, and a target electrode positioned in the path of said electron beam and in the path of said photoelectron image, said target electrode comprising magnesium oxide having a resistivity greater than $10^{11}$ ohm-centimeters and a material selected from the group consisting of indium and indium oxide having a resistivity less than $10^{11}$ ohm-centimeters, said target having a resistivity of about $10^{11}$ ohm-centimeters.

7. A television pickup tube comprising an evacuated envelope having an electron gun in one end thereof for producing an electron beam directed along a path, a photoemissive cathode in the other end of said envelope for producing a photoelectron image directed along a path, and a target electrode positioned in the path of said electron beam and in the path of said photoelectron image, said target electrode comprising a first material selected from the group consisting of magnesium oxide, aluminum oxide, and mixtures of magnesium oxide and aluminum oxide, and a second material selected from the group consisting of indium and indium oxide, said target having a resistivity of about $10^{11}$ ohm-centimeters.

8. A television pickup tube comprising an evacuated envelope having an electron gun in one end thereof for producing an electron beam directed along a first path, a photoemissive cathode in the other end of said envelope for producing a photoelectron image directed along a second path, and a target electrode positioned in the said first path of said electrode beam and in the said second path of said photoelectron image, said target electrode comprising a first material of aluminum oxide and a second material of indium.

References Cited

UNITED STATES PATENTS

| | | | |
|---|---|---|---|
| 2,493,539 | 1/1950 | Law | 313—89 |
| 2,582,843 | 1/1952 | Moore | 313—89 |
| 2,848,358 | 8/1958 | Gray | 117—211 |
| 2,887,632 | 5/1959 | Dalton | 317—238 |
| 2,888,372 | 5/1959 | Feibelman et al. | 117—211 |
| 2,922,907 | 1/1960 | Hannam | 313—89 |
| 2,967,344 | 1/1961 | Meuller | 317—235 X |
| 3,069,578 | 12/1962 | Hares et al. | 313—89 X |
| 3,090,881 | 5/1963 | Wellinger | 313—89 X |

JOHN W. HUCKERT, *Primary Examiner.*

ARTHUR GAUSS, JAMES D. KALLAM, DAVID J. GALVIN, *Examiners.*

R. F. POLISSACK, *Assistant Examiner.*

UNITED STATES PATENT OFFICE
CERTIFICATE OF CORRECTION

Patent No. 3,350,591 October 31, 1967

Robert L. Van Asselt

It is hereby certified that error appears in the above numbered patent requiring correction and that the said Letters Patent should read as corrected below.

Column 1, line 45, for "reatcion" read -- reaction --; line 56, for "type" read -- tube --; column 3, line 56, strike out "film during the oxidizing process described in the" and insert instead -- may also be used. For example, co-evaporation --.

Signed and sealed this 19th day of November 1968.

(SEAL)
Attest:

Edward M. Fletcher, Jr.
Attesting Officer

EDWARD J. BRENNER
Commissioner of Patents